Aug. 18, 1970 H. SCHÖNEMEYER ET AL 3,524,942

CONTROL FOR CENTRALLY CONTROLLED SWITCHING GRIDS IN TELECOMMUNICATION EXCHANGE SYSTEMS

Filed Sept. 20, 1966 2 Sheets-Sheet 1

United States Patent Office 3,524,942
Patented Aug. 18, 1970

3,524,942

CONTROL FOR CENTRALLY CONTROLLED SWITCHING GRIDS IN TELECOMMUNICATION EXCHANGE SYSTEMS

Hilmar Schonemeyer, Ditzingen, Walter Hackenberg, Hirschlanden, and Herbert Siegel, Munchingen, Germany, assignors to International Standard Electric Corporation, New York, N.Y., a corporation of Delaware Filed Sept. 20, 1966, Ser. No. 580,689
Claims priority, application Germany, Sept. 30, 1965, St 24,448
Int. Cl. H04q 3/48
U.S. Cl. 179—18 4 Claims

ABSTRACT OF THE DISCLOSURE

Switching control in a telephone system for originating and terminating internal traffic, for terminating external traffic, and for outgoing external traffic is provided by a single control group combined via a common directional grid with a common directional marker. Destination controls for internal traffic and for outgoing external traffic are actuated by a common group marker.

This invention relates in general to control devices for centrally controlled switching grids in telephone exchange systems, and more particularly to arrangements of the control devices in telephone exchanges.

It has been known in the past to divide the control equipment in telephone exchanges into three separate groups. The first group of control devices is used for controlling local calls originating in subscriber stations coupled directly to the exchange. The second group of control equipment or devices is used for controlling incoming trunk calls. The third group of control equipment is use dfor controlling outgoing trunk calls. The control equipment in each case utilizes the well known registers, translators, markers and access or directional matrices for coupling to the well known control equipment. The directional matrices are switching matrices for coupling between junction sets which are connected to the subscriber lines through well known switching matrices and from the junction sets to distributors going to particular trunk circuits. Thus, the directional grids are those which selectively connect calling or called subscribers to the proper points on distributor frames, for example.

These control groups form compact functional units which operate nearly independently. Such a strict separation of the control groups requires a corresponding expenditure in control devices.

In the past, these groupings of the control equipment has resulted in an efficient arrangement of the equipment. However, it has necessitated the use of redundant control equipment.

Accordingly, an object of this invention is to utilize the same control groupings so that the efficient arrangement is obtained, but in centralizing some of the control equipment so that common control equipment is used out of the group.

Thus, an object of this invention is to replace certain of the control equipment from each of the three groups with control equipment that is common to all of the three groups, and thus to make more efficient use of the control equipment.

The above-mentioned and other objects and features of the invention together with a manner of obtaining them will become more apparent, and the invention itself will be best understood by making reference to the following description of an exemplary embodiment of the invention taken in conjunction with the accompanying drawings wherein:

FIG. 1 shows the control group for originating and terminating internal traffic, the so-called A-group.

Figures 1, 2:
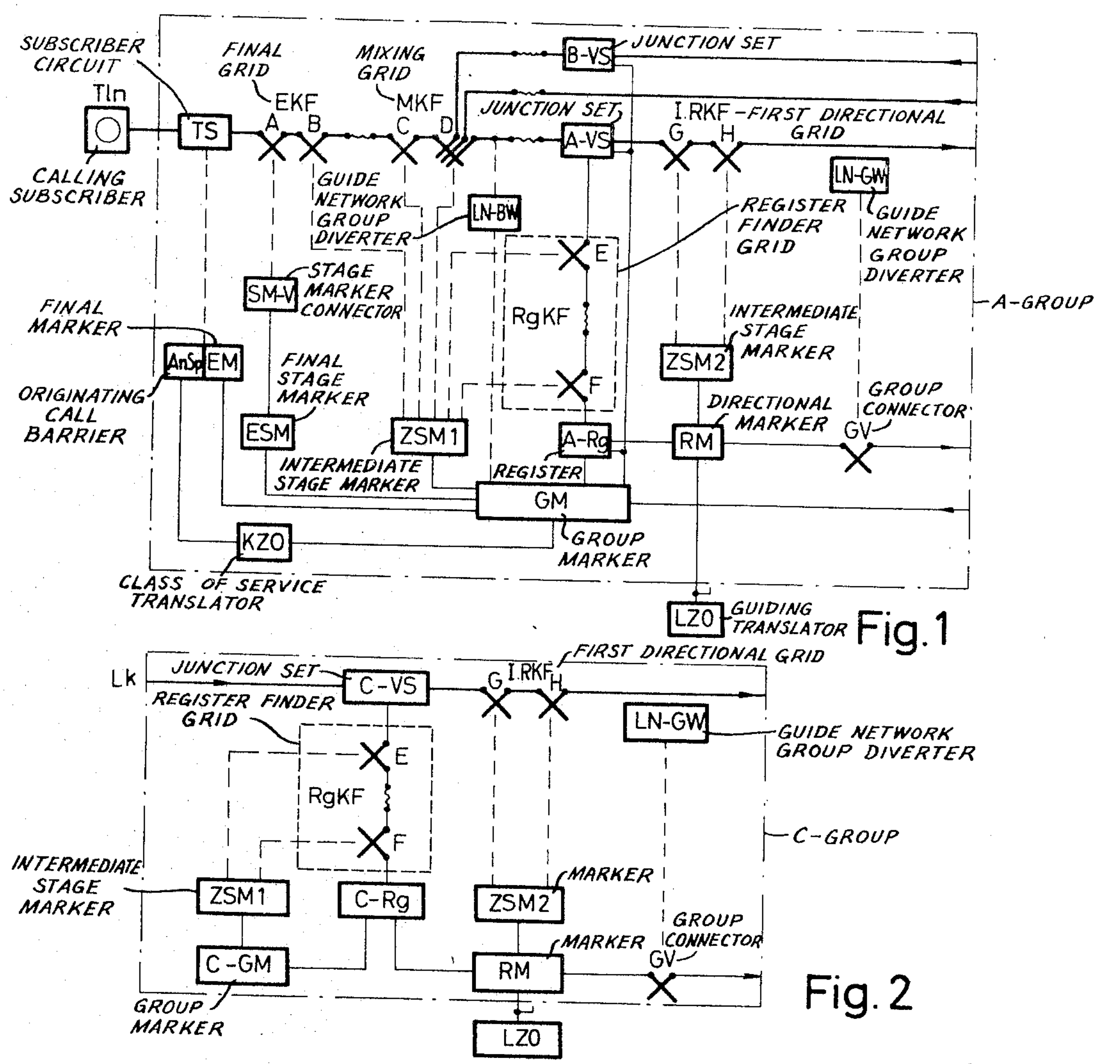
FIGS. 1–3 show block diagram form the control groups of a telephone exchange system as they are commonly grouped.

A telephone connection is established within the switching grid from the terminal point of the calling subscriber T*ln*, i.e. from the subscriber circuit TS, accommodated in the switching multiple of the A-stage, via a final grid EKF and a mixing grid MKF to a junction set A–VS, power supplying this section of the connection. The connection leads from the junction set A–VS to an intermediate distributor, common to all control groups of the exchange, via the first directional grid I. RKF. There the connecting paths are subdivided through a jumpering, on one hand to the junction sets B–VS for the called subscribers of the own A-group and probable further A-groups of the exchange, and, on the other hand, to the control groups for the outgoing external traffic, the so-called D-groups. From there the connections are extended to other exchanges and into the toll traffic level. It should be mentioned that outgoing trunk groups, with a high traffic load, are directly branched off at the first directional grid I. RKF of the A-groups, while trunk groups of a lower load are connected to the second or even to the third directional grid. Within the A-group the traffic aimed to a called subscriber is led from the junction set B–VS back to the switching stage D in the mixing grid MKF. The mixing grid MKF as well as the final grid EKF are used for both traffic directions, outgoing and terminating. The junction set A–VS has access to the registers A–R*g* via a register final grid R*g*KF with the switching stages E and F.

A directional marker RM with a plurality of tasks to perform is provided in the marking network. It secures that never two or more registers A–R*g* carry out a marking process simultaneously. Said directional marker picks up the call number from the register, interrogates from a guide network translator LZO, common to all control groups of the exchange, further setting information items and finally through-connects the marking network to other control groups via a group connector GV. A group marker GM controls the connections from the calling subscribers to the registers A–R*g* and the terminating traffic to the subscribers of the own control group. Intermediate stage markers ZSM1 and ZSM2 and a final stage marker ESM with a stage marker connector SM–V, carry out the route search in the switching network and the through-connection. Each final grid EKF with a defined number of subscriber lines disposes over a final marker EM which secures the access to the subscriber circuits TS for testing and marking purposes. The originating call carrier A*n*S*p*, associated to the same group of subscriber lines, prevents during a terminating call that new requests for establishing connections from the subscribers T*ln* of said control group become effective. In a class-of-service translator KZO the possibilities for jumpering of special information, individual to subscribers, are stored the consideration of which substantially increases the flexibility of the control during the marking processes. Finally a guide network group divertor LN–BW and a guide network super group divertor LN–GW serves special tasks during the route search in the guide network of the crosspoint arrangement.

FIG. 2 shows the block diagram of a control group for terminating external traffic, the so-called C-group, comprising a defined number of lines L*k* arriving from other exchanges or from the toll line lever. Each terminating line L*k* ends in a junction set C–VS. From there the connection is extended via a first directional grid with the switching stages G and H to the common intermediate distributor of all control groups. By the jumpering carried out there like in the A-groups, the outputs of the switching multiple H in the first directional grid I–RKF is led to the junction sets B–VS of the A-groups. If the exchange has to handle also through-traffic, e.g. to subsidiary exchanges, connections to the control groups for outgoing external traffic, the so-called D-groups, are required. The junction sets C–VS have access to the registers C–R*g* via a register final grid R*g*KF. An intermediate stage marker ZSM1 serves the route search in the register final grid R*g*KF, whereby a group marker C–GM supervises the upper roundup of the function and secures that never two or more marking processes are carried out at the same time. The route search in the first directional grid I. RKF is carried out by an intermediate stage marker ZSM2. The directional marker RM with the group connector GV and the guide network super-group divertor LN–GW have the same tasks in the C-groups as the corresponding facilities of the A-groups.

Figure 3:
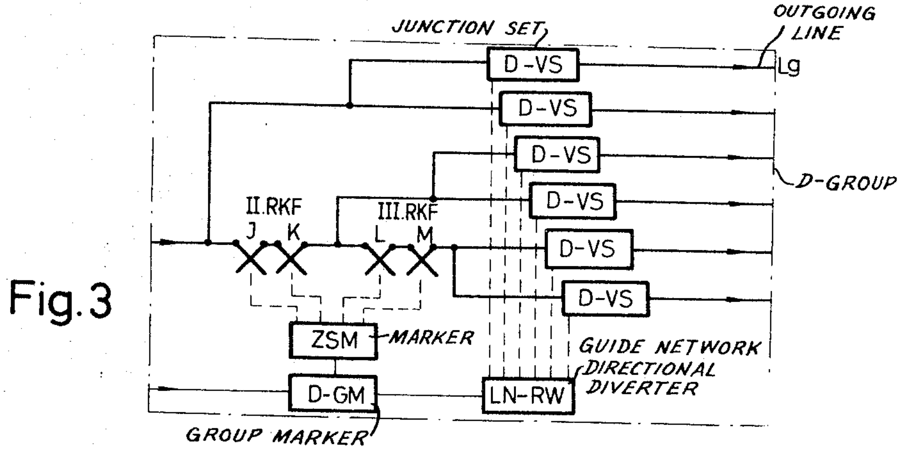

FIG. 3 finally shows the control group for outgoing external traffic, the so-called D-group, in a block diagram. As already mentioned line groups with a high traffic load are branched off directly in rear of the switching stages H of the first directional grid I. RKF of an A-group, while the groups with a lower traffic load can be reached only via a second or a third directional grid II. RKF or III. RKF, respectively. Each outgoing line L*g* leads over a junction set D–VS, which on one hand permits the access of the marking devices to the individual lines and, on the other hand serves the adaptation to the conditions of the outgoing lines L*g*. An intermediate stage marker ZSM carries out the route search in the switching stages J, K, L and M of the second and third directional grids II. RKF and III. RKF, while a guide network directional divertor LN–RW receives the information items on the line group to be actuated and designates the junction sets D–VS of all lines of the intergroup. A group marker D–GM finally secures that only one A- or one C-group carries out the marking process to said D-group. Moreover, said group marker D–GM supervises the run-down of the functions.

As the above explanations show, such a subdivision of an exchange system into these various control groups means a considerable expenditure in control facilities. Each control group has separate central control devices which handle a traffic the higher their function speed is.

At such an unflexible grouping of an exchange system the capacity of the quickly operating electronic control devices is not fully used, if in smaller exchanges the control groups fall below a defined size.

It is the object of the invention to modify the subdivision into control groups in telecommunication, and particularly in telephone exchange systems, in such a way that the central control devices and the switching grids are used in a more intensive manner. The control device for centrally controlled switching grids in telecommunication, and particularly telephone exchange systems, is subdivided into different control groups for outgoing and terminating internal traffic, for terminating external traffic and for outgoing external traffic. It is characterised in this that a common directional grid with a common directional marker is associated always to one control group for outgoing and terminating internal traffic, to a control group for terminating external traffic and to a control group for outgoing external traffic, and that a terminating device of the control group for outgoing and terminating internal traffic and of the control group for outgoing external traffic is actuated by a group marker, common to all of these combined control groups. This combination of always an A-group with a C- and D-group, as the control is concerned, results in a more intensely used directional grid and in savings on markers.

According to a further embodiment of the new control device the actuation of the different destination indicators of the A- and D-group can be eased that these indicators are actuated by a common group marker via a final marker. This final marker is subdivided into two functional units, serving both control groups of destination indicators.

Connections from the junction set of the calling subscriber to the junction set of the called subscriber can be established via the common directional grid in the control group for originating and terminating internal traffic, or via another directional grid to a junction set at an outgoing line in the control group for outgoing external traffic, as well as connections from the junction set of a terminating line in the control group for terminating external traffic to a junction set of the called subscriber in the control group for originating and terminating internal traffic, or via another directional grid to a junction set at an outgoing line in the control for outgoing external traffic.

The expenditure in control devices and crosspoint elements can be further reduced in this combination of always one of the three different control groups in that the register finder grid of the control group for originating and terminating internal traffic and the register finder grid of the control group for terminating external traffic are combined, and that the functions of the registers of both control groups are taken over by common registers of both combined control groups. The control of the common register finder grid can be taken over at this combination by a common group marker which now carries out the functions of the group markers of the control groups with originating and terminating internal traffic and of the control group with terminating external traffic. This group marker also carries out the control functions in the D-group.

A further concentration in the switching network and in the control device is characterised in this that a part of the mixing grid of the control group for originating and terminating internal traffic is operated as a second directional grid of the control group for outgoing external traffic.

Figure 4:
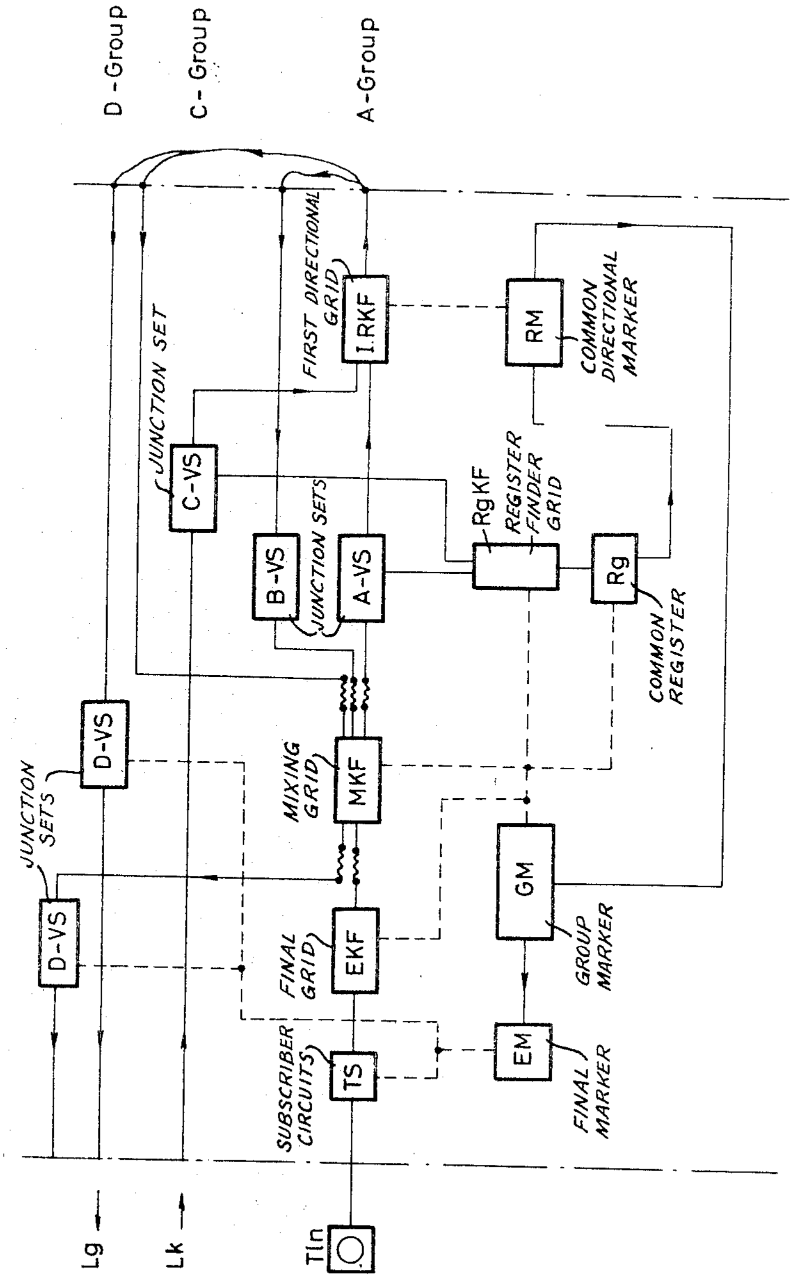
FIG. 4 shows a grouping of the control equipment of a telephone exchange system wherein improvement is made over arrangements of FIGS. 1–3 by utilizing certain of equipment in common.

The invention is in detail explained with the aid of a block diagram shown in FIG. 4, representing the combination of always one A-group with a C- and D-group, according to the invention.

Only the deviations in the control portion are emphasized which result with regard to the unflexible grouping shown in the FIGS. 1 to 3.

The first directional grid I. RKF is now actuated by the junction set A–VS of the calling subscriber of the control group for originating and terminating internal traffic and by the junction set C–VS of the control group for terminating external traffic. A common directional marker RM controls the establishment of a connection via the first directional grid I. RKF.

The junction sets A–VS of the A-group as well as the junction sets C–VS of the C-group have access to common registers R*g* via a common register finder grid R*g*KF, which registers can carry out the functions required for both control groups. This common register finder grid R*g*KF is controlled by a group marker GM, common for all three control groups.

The D-group is included with regard to the control in that the common group marker GM actuates a destination indicator of one or the other group via a final marker EM. This final marker has access to the subscriber circuits TS of the A-group and to the junction sets D–VS at the outgoing lines L*g* of the D-group. A single group discrimination can be obtained by forming two functional units in the final marker EM, which units are associated to both control groups A and D.

The outgoing external traffic of the D-group can be directly branched off via the output of the first directonal grid I. RKF, indicated by the junction set D–VS, directly reachable via the intermediate distributor. A second selection of the direction can simply be provided where, from a common intermediate distributor of the control groups, lines are led across a portion of the mixing grid MKF of the A-group as shows the junction set D–VS.

If one compares the expenditure in control devices of this combined control triple group with the expenditure of the three different control groups according to FIGS. 1 to 3, the savings, particularly in the switching network and in markers, is clearly visible.

Because of the high operating speed of electronic control devices this combination of always one of the three different groups can be carried out without perceivable delays.

What is claimed is:

1. A control equipment arrangement for arranging the control equipment of a telephone exchange into three groups, the first group of control equipment being utilized for controlling local calls, the second group of control equipment being utilized for controlling incoming trunk calls, and the third group of control equipment being utilized for controlling outgoing trunk calls, said arrangement including means for utilizing certain of the control equipment in common, said control equipment in said first group controlling equipment for completing local calls such as line circuit means for coupling local subscriber stations to said exchange, switching matrix means coupling said line circuits to first junction sets, said switching matrix means comprising final stages serially connected to one side of mixing stages, said final stages coupled to said line circuits, said first junction sets coupled directly to the other side of said mixing stages, return junction sets also coupled to the other side of said mixing stages, said control equipment including directional grid means coupled to said first junction sets, said second group of control equipment controlling means including incoming trunk circuits, means for coupling said incoming trunk circuits to the input side of said directional grid means, said third group of control equipment controlling means including outgoing trunk circuits, means for coupling the output of said directional grid means to said outgoing trunk circuits, and means for coupling said directional grid means to the junction side of said mixing stage whereby said directional grid is common to all three of said control groups.

2. The control arrangement of claim 1 wherein a common marker is used for controlling said directional marker, said common marker being common to all three of said groups.

3. The control device of claim 2 wherein means are provided for coupling the final stage side of said mixing stage directly to certain of the outgoing trunk circuits.

4. The control arrangement of claim 3 wherein common registers are used for the first and the second control groups, and common registers finders also being utilized for said first and second control groups.

No references cited.

WILLIAM C. COOPER, Primary Examiner